United States Patent
Howard et al.

[11] Patent Number: 6,013,999
[45] Date of Patent: Jan. 11, 2000

[54] STEPPER MOTOR CONTROL THAT ADJUSTS TO MOTOR LOADING

[75] Inventors: David E. Howard, Hazel Green; Frank J. Nola, Huntsville, both of Ala.

[73] Assignee: The United States of America as represented by the Administrator of the National Aeronautics and Space Administration, Washington, D.C.

[21] Appl. No.: 09/160,206

[22] Filed: Sep. 21, 1998

[51] Int. Cl.$^7$ ........................................ G05B 19/40

[52] U.S. Cl. .................... 318/685; 318/696; 318/648; 318/649; 318/585; 318/654

[58] Field of Search .................... 318/685, 696, 318/648, 649, 585, 654

[56] References Cited

U.S. PATENT DOCUMENTS 3,984,748  10/1976  Sullivan ........................ 318/648

OTHER PUBLICATIONS

Power–Conserving Stepping–Motor Drive Circuits, *United States National Aeronautics and Space Administration Tech Briefs*, Jul. 1994, p. 30, vol. 18 #7, Associated Business Publications Co., NY,NY.

Simpler Power–Conserving Stepping–Motor Drive Circuit, *United States National Aeronautics and Space Administration Tech Briefs*, Mar. 1997, p. 6b, vol. 21 No. 3, Associated Business Publications Co., NY, NY.

*Primary Examiner*—Karen Masih
*Attorney, Agent, or Firm*—Robert L. Broad. Jr.

[57] ABSTRACT

A system and method are provided for controlling a stepper motor having a rotor and a multi-phase stator. Sinusoidal command signals define a commanded position of the motor's rotor. An actual position of the rotor is sensed as a function of an electrical angle between the actual position and the commanded position. The actual position is defined by sinusoidal position signals. An adjustment signal is generated using the sinusoidal command signals and sinusoidal position signals. The adjustment signal is defined as a function of the cosine of the electrical angle. The adjustment signal is multiplied by each sinusoidal command signal to generate a corresponding set of excitation signals, each of which is applied to a corresponding phase of the multi-phase stator.

22 Claims, 2 Drawing Sheets

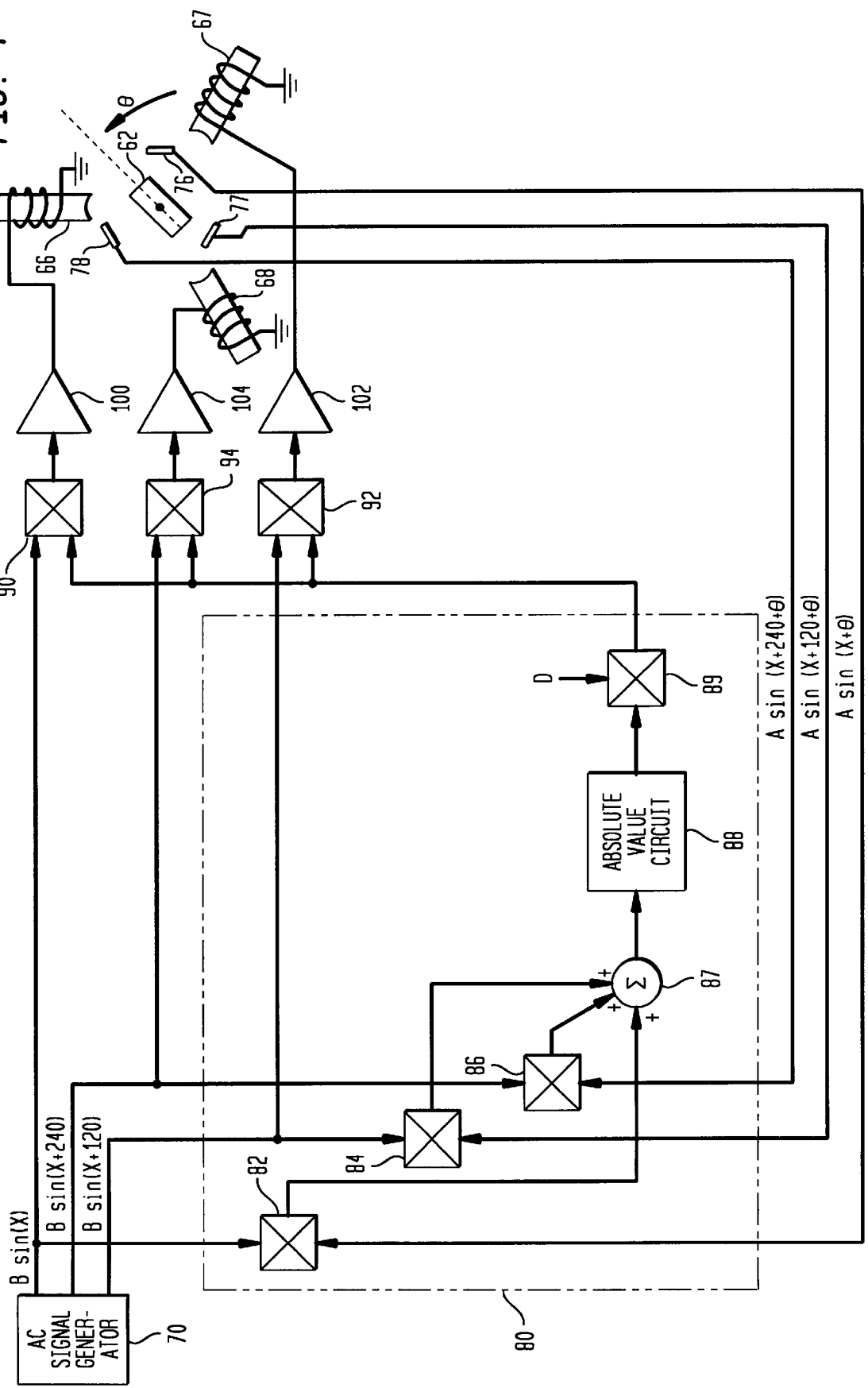

STEPPER MOTOR CONTROL THAT ADJUSTS TO MOTOR LOADING

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to control systems for stepper motors. More specifically, the invention is a control system and method for stepper motors that adjusts to motor loading in order to reduce internal power dissipation losses.

2. Description of the Related Art

Stepper motors are used in a wide variety of machines to provide digital control of moving parts. However, typical stepper motors exhibit several undesirable characteristics. Principal among these characteristics are: insufficient resolution due to a relatively low number of steps per revolution (e.g., 200 steps per motor revolution); a high ripple torque; and a high constant internal power dissipation regardless of motor load. While the resolution and ripple torque problems can be addressed by providing high resolution motor command signals, the problem of constant internal power dissipation has been a continuing source of power loss.

The internal power dissipation of stepper motor is a function of motor current I and the resistance R of a motor winding. Accordingly, if the stepper motor is driven by a constant current source, power dissipation (or $I^2R$) will remain constant regardless of the load on the stepper motor. As a result, the stepper motor generates heat associated with the fully-loaded condition even when the motor is only lightly-loaded. The unnecessary production and build-up of heat can be detrimental to the motor itself as well as surrounding components.

SUMMARY OF THE INVENTION

Accordingly, it is an object of the present invention to provide a stepper motor control system and method that reduces internal power dissipation losses.

Another object of the present invention is to provide a stepper motor control system and method that adjusts to motor loading in order to reduce internal power dissipation losses in a commensurate fashion.

Still another object of the present invention is to provide a stepper motor control system and method that reduces internal power dissipation losses without adversely affecting the motor's ability to respond to load changes.

Other objects and advantages of the present invention will become more obvious hereinafter in the specification and drawings.

In accordance with the present invention, a system and method are provided for controlling a stepper motor having a rotor and a multi-phase stator. A signal generator generates a plurality of sinusoidal command signals which, if applied to the multi-phase stator, would cause the rotor to rotate. At any point during a cycle of the sinusoidal command signals, a commanded position of the rotor is defined by the sinusoidal command signals. Position sensors sense an actual position of the rotor as a function of an electrical angle between the actual position and the commanded position. The actual position is thus defined by a plurality of sinusoidal position signals, each of which is output from a corresponding one of the position sensors. A controller, coupled to the signal generator and position sensors, generates an adjustment signal using the sinusoidal command signals and sinusoidal position signals. The adjustment signal is defined as a function of the cosine of the electrical angle. Multiplication circuitry, coupled to the controller and signal generator, multiplies the adjustment signal by each sinusoidal command signal to generate a plurality of excitation signals. Each excitation signal is applied to a corresponding phase of the multi-phase stator.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein:

FIG. 4 is a schematic block diagram of a stepper motor control used to control rotation of a three-phase stepper motor in accordance with the present invention;

DESCRIPTION OF THE PREFERRED EMBODIMENT(S)

Figure 1:
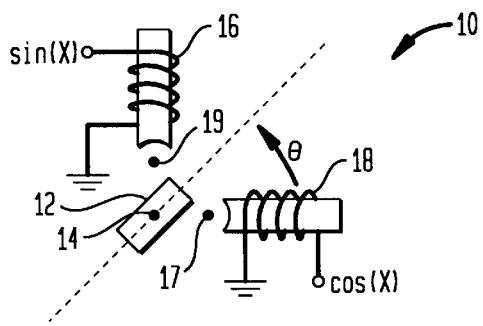
FIG. 1 is a schematic diagram of a conventional two-phase stepper motor.

Referring now to the drawings, and more particularly to FIG. 1, a conventional stepper motor is shown schematically and referenced generally by 10. By way of example, the stepper motor shown is a two-phase stepper motor having a rotor 12 that is typically a permanent magnet mounted such that it can rotate about an axis 14 thereof. Two-phase stepper motor 10 also has a multi-phase stator that defines, in this example, two phases of the stepper motor. The two phases of the multi-phase stator are illustrated schematically by windings 16 and 18.

As is known in the art, a sine wave of current is applied to one phase (e.g., a signal of the form sin(X) applied to winding 16) and a cosine wave of current is applied to the second phase (e.g., a signal of the form cos(X) applied to winding 18). The amplitude of the sine and cosine terms defines the amplitude of the applied current and the frequency of the sine and cosine terms defines the rate at which rotor 12 turns. The torque produced by rotor 12 rotating about axis 14 is the vector sum of the product of the rotor and stator fluxes to produce a constant torque. That is, the torque T produced by stepper motor 10 is given as $$T = K^* I^* [\cos(X)^* \cos(X+\theta) + \sin(X)^* \sin(X+\theta)] \quad (1)$$

where K is the torque constant of stepper motor 10, I is the peak current in stepper motor 10 and $\theta$ is the phase or electrical angle between the commanded rotor position dictated by sin(X) and cos(X) and the actual rotor position. When measured from a position located 90 electrical degrees away from each phase of the multi-phase stator (i.e., 90 electrical degrees away from each of windings 16 and 18), the actual rotor position can be defined by the sinusoidal terms sin(X+$\theta$) and cos(X+$\theta$). More specifically, the sin(X+$\theta$) signal is measured at a position 17 located 90 electrical degrees away from winding 16 while the cos(X+θ) signal is measured at a position 19 located 90 electrical degrees away from winding 18.

Simplifying equation (1) using trigonometric identities, the torque T can be written as $$T = K*I*\cos\theta \tag{2}$$

When stepper motor 10 is lightly-loaded, angular difference θ approaches ±90° thereby resulting in a very inefficient motor if current I is constant. As stepper motor 10 is more heavily loaded, the electrical angle θ approaches 0° thereby improving motor efficiency. It is this discrepancy in motor efficiency that the stepper motor control of the present invention improves upon.

Figure 2:
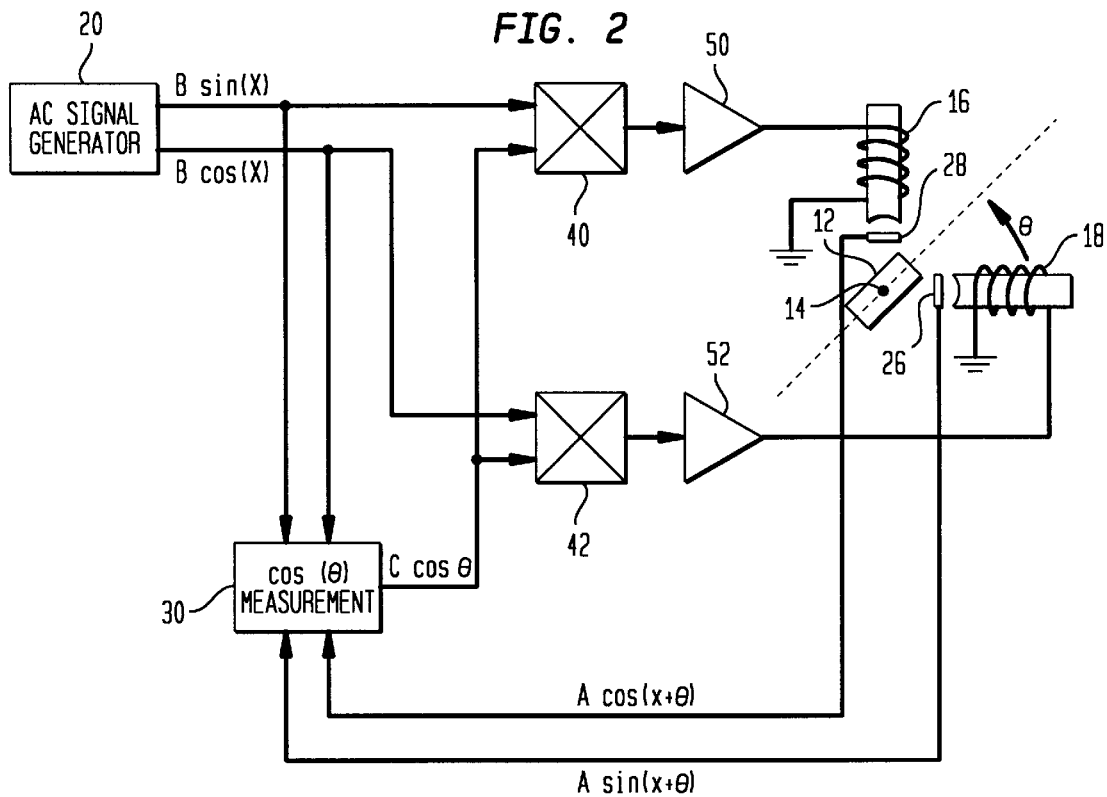
FIG. 2 is a schematic block diagram of a stepper motor control according to the present invention used to control rotation of a two-phase stepper motor.

Referring now to FIG. 2, one embodiment of the stepper motor control in accordance with the present invention is shown schematically. By way of example, the stepper motor being controlled is a two-phase stepper motor such as the one described with the aid of FIG. 1. Accordingly, like reference numerals are used for the common elements of FIGS. 1 and 2.

In the present invention, an AC signal generator 20 provides sinusoidal command signals B*sin(X) and B*cos(X) where B defines the amplitude of the sine and cosine command signals. AC signal generator 20 can be any conventional device capable of producing the necessary command signals. However, in terms of addressing the resolution and high ripple torque problems often associated with conventional stepper motors, it may be desirable for the command signals to be generated as high-resolution clock inputs. Circuitry for generating such clock input type command signals is disclosed in U.S. Pat. No. 5,173,696.

Rather than applying the B*sin(X) and B*cos(X) command signals directly to windings 16 and 18, the present invention adjusts the command signals in proportion to the load on the motor. In general, the command signals are adjusted as a function of the electrical angle θ between the commanded position of rotor 12 (as defined by B*sin(X) and B*cos(X)) and the actual position of rotor 12. More specifically, the present invention electronically measures cos(θ) and uses this information to increase or decrease the amplitude of the command signals in order to provide only the amount of torque required for a given load situation. This results in improved motor efficiency regardless of the loading on the motor.

To measure cos(θ) electronically, the present invention uses the sinusoidal command signals and the sinusoidal signals indicative of actual rotor position. The actual position signals are generated by position sensors 26 and 28 which are positioned 90 electrical degrees away from windings 16 and 18, respectively. Thus, as explained above, position sensor 26 will generate a signal of the form $$A*\sin(X+\theta) \tag{3}$$

while position sensor 28 will generate a signal of the form $$A*\cos(X+\theta) \tag{4}$$

where A is the peak amplitude detected by the position sensors. In other words, position sensors 26 and 28 are positioned such that they produce sinusoidal position signals in phase with the back electromagnetic force (emf) generated by each phase (i.e., winding) of the stepper motor.

Position sensors 26 and 28 are generally identical in type and can be implemented by a variety of digital or analog sensors. For example, sensors 26 and 28 could be Hall effect sensors or RVDT (rotating variable differential transformer) sensors. Resolver or encoder type sensors, such as those disclosed in U.S. Pat. No. 5,451,945, could also be used.

Figure 3:
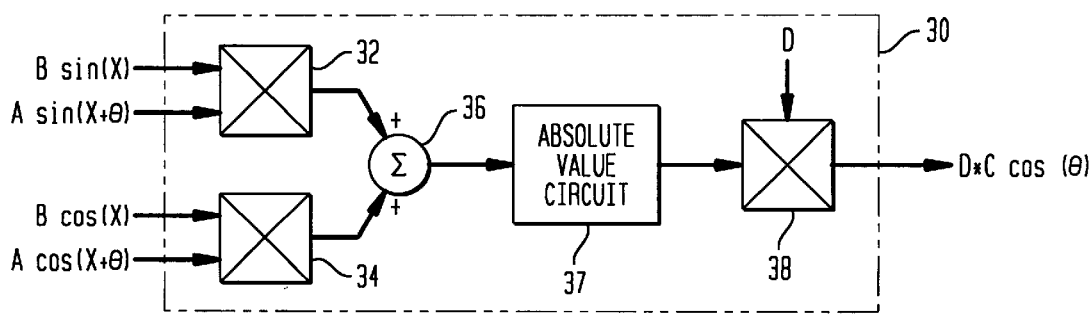
FIG. 3 is a schematic block diagram of an embodiment of the $\cos(\theta)$ measurement block.

The command and actual position signals are input to a cos(θ) measurement block 30. An embodiment for implementing block 30 is illustrated in FIG. 3 where command signal B*sin(X) is multiplied by position A*sin(X+θ) at multiplier 32. In a similar fashion, command signal B*cos(X) is multiplied by position signal A*cos(X+θ) at multiplier 34. A vector sum of the multiplied outputs of multipliers 32 and 34 is formed at an adder 36 to provide a cos(θ) measurement of the form $$C*\cos(\theta) \tag{5}$$

where C is a constant equal to the product of A*B.

Note that cos(θ) can be positive or negative depending on the value of θ. However, cos(θ) in the present invention must always be positive for reasons that will be explained further below. While some applications exist where cos(θ) may always be positive (e.g., an escalator motor because of its inherent one-directional loading), cos(θ) can be negative in many applications. Accordingly, an absolute value circuit 37 is generally or preferably provided after adder 36 to guarantee a positive cos(θ) measurement. Also, it may be necessary to further multiply by a gain D at gain unit 38 so that the adjustment signal (as a function of cos (θ)) will be sufficient to overcome bearing friction and other motor losses for the unloaded motor case. The gain D should also be set such that when full load is applied to the stepper motor, a maximum current is commanded.

The adjustment signal output from cos(e) measurement block 30 is fed to each of two multipliers 40 and 42 along with one of the command signals from AC signal generator 20. The resulting adjusted outputs from multipliers 40 and 42 serve as the excitation signals for windings 16 and 18, respectively. As mentioned above, the cos(θ) measurement must be positve to prevent rotor 12 from jumping or skipping poles which could cause an unstable motor condition. Note that it may be necessary to amplify the excitation signals at amplifiers 50 and 52, respectively, as is known in the art.

The present invention can be extended for use with any multi-phase stepper motor and is not limited to use with two-phase stepper motors. For example, as shown in FIG. 4, the present invention has been extended for use with a three-phase stepper motor having a rotor 62 with its three phases depicted by windings 66, 67 and 68 spaced 120 electrical degrees from one another. An AC signal generator 70 provides sinusoidal command signals of the form B*sin(X), B*sin(X+120) and B*sin(X+240). The actual position signals are generated by position sensors 76, 77 and 78 which are positioned 90 electrical degrees away from windings 66, 67 and 68, respectively. Thus, position sensor 76 will generate a sinusoidal position signal of the form $$A*\sin(X+\theta) \tag{6}$$

Position sensor 77 will generate a sinusoidal position signal of the form $$A*\sin(X+120+\theta) \tag{7}$$

and position sensor 78 will generate a sinusoidal position signal of the form $$A*\sin(X+240+\theta) \tag{8}$$

where A is the peak amplitude detected by the position sensors. Thus, as in the two-phase embodiment, position sensors 76, 77 and 78 are positioned such that they produce sinusoidal position signals that are in phase with the back emf generated by a phase of the stepper motor.

A cos(θ) measurement block 80 has multipliers 82, 84 and 86 for multiplying one of the command signals by the corresponding position sensor providing the sinusoidal position signal that is in phase with the back emf generated by the stator phase located 90 electrical degrees from the corresponding position sensor. That is, the command signal B*sin(X) is multiplied by the output of position sensor 76, the command signal B*sin(X+120) is multiplied by the output of position sensor 77, and the command signal B*sin(X+240) is multiplied by the output of position sensor 78. The outputs of multipliers 82, 84 and 86 are summed at an adder 87 to produce the following vector sum $$[(B*\sin(X))*(A*\sin(X+\theta))] + [(B*\sin(X+120))* \\ (A*\sin(X+120+\theta))] + [(B*\sin(X+240))* \\ (A*\sin(X+240+\theta))] \quad (9)$$

Equation (9) can be reduced in accordance with well known trigonometric identities to $$1.5*\cos(\theta) \quad (10)$$

As in the two phase embodiment, an absolute value circuit 88 is generally or preferably provided after adder 87 to guarantee a positive cos(θ) measurement. Finally, as in the two phase embodiment, a gain D may be applied by gain unit 89.

The adjustment signal output of cos(θ) measurement block 80 is fed to each of multipliers 90, 92 and 94 along with one of the command signals from AC signal generator 70. The resulting adjusted outputs from multipliers 90, 92 and 94 serve as the excitation signals for windings 66, 67 and 68, respectively. Again, as is known in the art, it may be necessary to amplify the excitation signals at amplifiers 100, 102 and 104.

The advantages of the present invention are numerous. The internal power dissipation losses inherent in lightly-loaded stepper motors are reduced by the present invention. This is accomplished by measuring motor loading in terms of actual rotor position versus a commanded rotor position. No bias voltages or filtering is required thereby allowing the control system of the present invention to respond nearly instantaneously to changes in loads on a stepper motor. The present invention can be used to improve the performance of a two-phase, three-phase, or any multi-phase stepper motor.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for controlling a stepper motor having a rotor and a multi-phase stator, comprising:

a signal generator for generating a plurality of sinusoidal command signals which, if applied to said multi-phase stator, would cause said rotor to rotate wherein, at any point during a cycle of said plurality of sinusoidal command signals, a commanded position of said rotor is defined by said plurality of sinusoidal command signals;

a plurality of position sensors for sensing an actual position of said rotor as a function of an electrical angle between said actual position and said commanded position, said actual position being defined by a plurality of sinusoidal position signals, each of said plurality of sinusoidal position signals being output from a corresponding one of said plurality of position sensors;

a controller coupled to said signal generator and said plurality of position sensors for generating an adjustment signal using said plurality of sinusoidal command signals and said plurality of sinusoidal position signals, said adjustment signal defined as a function of the cosine of said electrical angle, said controller having an adder for adding vector sums of combinations of said plurality of sinusoidal command signals and said plurality of sinusoidal position signals to obtain said adjustment signal, said controller also having a gain unit for amplifying said adjustment signal; and multiplication circuitry coupled to said controller and said signal generator for multiplying said adjustment signal by each of said plurality of sinusoidal command signals to generate a plurality of excitation signals, each of said plurality of excitation signals being applied to a corresponding phase of said multi-phase stator, said gain unit feeding said amplified adjustment signal directly to said multiplicaiton circuitry.

2. A system as in claim 1 wherein said corresponding phase of said multi-phase stator is associated with a corresponding one of said plurality of position sensors that is positioned 90 electrical degrees from said corresponding phase.

3. A system as in claim 2 wherein said controller comprises:

a plurality of multipliers coupled to said signal generator and said plurality of position sensors, each of said plurality of multipliers multiplying a corresponding one of said plurality of sinusoidal command signals that is used to generate a corresponding one of said plurality of excitation signals by a corresponding one of said plurality of sinusoidal position signals output from said corresponding one of said plurality of position sensors positioned 90 electrical degrees from said corresponding phase of said multi-phase stator receiving said corresponding one of said plurality of excitation signals, wherein each of said plurality of multipliers provides a multiplied output; and said adder coupled to said plurality of multipliers for combining each said multiplied output to form said adjustment signal.

4. A system as in claim 3 further comprising an absolute value circuit coupled to said adder for forming an absolute value of said adjustment signal.

5. A system as in claim 1 wherein each of said plurality of position sensors is selected from the group consisting of analog and digital position sensors.

6. A system as in claim 1 wherein said stepper motor is a two-phase stepper motor, wherein said plurality of sinusoidal command signals comprise a first sinusoidal command signal of the form sin(X) and a second sinusoidal command signal of the form cos(X), and wherein said plurality of position sensors comprise:

a first position sensor positioned with respect to said multi-phase stator to output a first sinusoidal position signal of the form sin(X+θ); and a second position sensor positioned with respect to said multi-phase stator to output a second sinusoidal position signal of the form $\cos(X+\theta)$ where $\theta$ is said electrical angle.

7. A system as in claim 1 wherein said stepper motor is a three-phase stepper motor, wherein said plurality of sinusoidal command signals comprise a first sinusoidal command signal of the form $\sin(X)$, a second sinusoidal command signal of the form $\sin(X+120)$ and a third sinusoidal command signal of the form $\sin(X+240)$, and wherein said plurality of position sensors comprise:

a first position sensor positioned with respect to said multi-phase stator to output a first sinusoidal position signal of the form $\sin(X+\theta)$;

a second position sensor positioned with respect to said multi-phase stator to output a second sinusoidal position signal of the form $\sin(X+120+\theta)$; and a third position sensor positioned with respect to said multi-phase stator to output a third sinusoidal position signal of the form $\sin(X+240+\theta)$ where $\theta$ is said electrical angle.

8. A system as in claim 1 further comprising amplifying circuitry coupled between said multiplication circuitry and said multi-phase stator for amplifying said plurality of excitation signals.

9. A system for controlling a stepper motor having a rotor and a multi-phase stator defining a plurality of phases, comprising:

a signal generator for generating a plurality of sinusoidal command signals which, if applied to said multi-phase stator, would cause said rotor to rotate wherein, at any point during a cycle of said plurality of sinusoidal command signals, a commanded position of said rotor is defined by said plurality of sinusoidal command signals, each of said plurality of sinusoidal command signals being associated with corresponding phase of said plurality of phases;

a plurality of position sensors, each of said plurality of position sensors being positioned 90 electrical degrees away from one phase of said plurality of phases for sensing an actual position of said rotor as a function of an electrical angle between said actual position and said commanded position that is associated with said corresponding phase, said plurality of position sensors outputting a corresponding plurality of sinusoidal position signals;

a first plurality of multipliers, each of said first plurality of multipliers coupled to said signal generator and one of said plurality of position sensors for multiplying one of said plurality of sinusoidal command signals associated with said corresponding phase by one of said plurality of sinusoidal position signals associated with said corresponding phase wherein each of said plurality of first multipliers provides a first multiplied output;

a combining circuit coupled to said first plurality of multipliers for combining each said first multiplied output to generate an adjustment signal defined as a function of the cosine of said electrical angle; and a second plurality of multipliers, each of said second plurality of multipliers coupled to said signal generator and one of said first plurality of multipliers for multiplying one of said plurality of sinusoidal command signals associated with said corresponding phase by said adjustment signal to generate an excitation signal associated with said corresponding phase that is applied to said corresponding phase of said multi-phase stator.

10. A system as in claim 9 further comprising an absolute value circuit coupled to said combining circuit for forming an absolute value of said adjustment signal.

11. A system as in claim 9 wherein said combining circuit is an adder.

12. A system as in claim 9 wherein each of said plurality of position sensors is selected from the group consisting of analog and digital position sensors.

13. A system as in claim 9 further comprising amplifying circuitry coupled between said second plurality of multipliers and said multi-phase stator for amplifying each said excitation signal.

14. A system for controlling a stepper motor having a rotor and a multi-phase stator defining a plurality of phases, comprising:

a signal generator for generating a plurality of sinusoidal command signals which, if applied to corresponding ones of said plurality of phases of said multi-phase stator, would cause said rotor to rotate and generate a back electromagnetic force (emf) at each of said plurality of phases;

a plurality of position sensors corresponding to said plurality of phases, each of said plurality of position sensors being positioned relative to said multi-phase stator to produce a sinusoidal position signal in phase with said back emf associated with at a corresponding one of said plurality of phases;

a controller coupled to said signal generator and said plurality of position sensors for generating an adjustment signal using said plurality of sinusoidal command signals and each said sinusoidal position signal; and multiplication circuitry coupled to said controller and said signal generator for multiplying said adjustment signal by each said sinusoidal command signal to generate a plurality of excitation signals applied to said corresponding ones of said plurality of phases.

15. A system as in claim 14 wherein each of said plurality of position sensors is selected from the group consisting of analog and digital position sensors.

16. A system as in claim 14 further comprising amplifying circuitry coupled between said multiplication circuitry and said multi-phase stator for amplifying said plurality of excitation signals.

17. A method of controlling a stepper motor having a rotor and a multi-phase stator, comprising:

generating a plurality of sinusoidal command signals which, if applied to said multi-phase stator, would cause said rotor to rotate wherein, at any point during a cycle of said plurality of sinusoidal command signals, a commanded position of said rotor is defined by said plurality of sinusoidal command signals;

sensing an actual position of said rotor as a function of an electrical angle between said actual position and said commanded position, said actual position being defined by a plurality of sinusoidal position signals;

generating an adjustment signal using said plurality of sinusoidal command signals and said plurality of sinusoidal position signals, said adjustment signal defined as a function of the cosine of said electrical angle;

multiplying said adjustment signal by each of said plurality of sinusoidal command signals to generate a plurality of excitation signals; and applying each of said plurality of excitation signals to a corresponding phase of said multi-phase stator.

18. A method according to claim 17 wherein said step of sensing said actual position is accomplished for each said corresponding phase of said multi-phase stator from a position that is 90 electrical degrees from said corresponding phase.

19. A method according to claim 18 wherein said step of generating comprises the steps of:

multiplying a corresponding one of said plurality of sinusoidal command signals that is used to generate a corresponding one of said plurality of excitation signals by a corresponding one of said plurality of sinusoidal position signals sensed from said position that is 90 electrical degrees from said corresponding phase of said multi-phase stator receiving said corresponding one of said plurality of excitation signals, wherein a corresponding plurality of multiplied outputs is generated; and combining said plurality of multiplied outputs to form said adjustment signal.

20. A method according to claim 19 further comprising the step of taking the absolute value of said adjustment signal.

21. A method according to claim 19 wherein said step of combining comprises the step of adding.

22. A method according to claim 17 further comprising the step of amplifying said plurality of excitation signals prior to said step of applying.

* * * * *